(12) United States Patent
Amariei

(10) Patent No.: US 12,208,056 B1
(45) Date of Patent: Jan. 28, 2025

(54) FEEDBACK UNIT, WEARABLE DEVICE COMPRISING THE FEEDBACK UNIT AND METHODS FOR VISUAL GUIDING THE MOVEMENT OF A VISUALLY IMPAIRED USER HAVING MODERATE IMPAIRMENT

(71) Applicant: DOTLUMEN S.R.L., judetul Cluj (RO)

(72) Inventor: Cornel-Marian Amariei, Comuna Floresti-Stoenesti (RO)

(73) Assignee: DOTLUMEN S.R.L., Cluj-Napoca (RO)

( * ) Notice: Subject to any disclaimer, the term of this patent is extended or adjusted under 35 U.S.C. 154(b) by 0 days.

(21) Appl. No.: 18/748,339

(22) Filed: Jun. 20, 2024

(30) Foreign Application Priority Data

Jul. 28, 2023 (EP) .................................... 23188524

(51) Int. Cl.
*A61H 3/06* (2006.01)
(52) U.S. Cl.
CPC .................................. *A61H 3/061* (2013.01)
(58) Field of Classification Search
None
See application file for complete search history.

(56) References Cited

U.S. PATENT DOCUMENTS

| 10,565,755 B2 | 2/2020 | Thuillier et al. |
| 11,525,684 B2 | 12/2022 | Kozhaya et al. |
| 2018/0271740 A1* | 9/2018 | Lydecker ............. G02B 27/017 |

FOREIGN PATENT DOCUMENTS

| GB | 2585241 | 1/2021 |
| WO | WO 2008119187 | 10/2008 |

OTHER PUBLICATIONS

Extended Search Report in EP Appln. No. 23188524.5, dated Jan. 29, 2024, 12 pages.

* cited by examiner

*Primary Examiner* — Thomas S McCormack
(74) *Attorney, Agent, or Firm* — Fish & Richardson P.C.

(57) ABSTRACT

This patent relates to a feedback unit for visual guiding the movement of a visually impaired user having moderate impairment, comprising means to receive navigation information from an environment processing unit; a processing module for processing the navigation information and outputting visual guidance instructions to the user; a visual representation module displaying the visual guidance instructions to the user, which include: visual guiding modes along the path: light guiding strip, visual cues signalling the direction, milestones visual, tunnel; and visual guiding modes in respect to a selected obstacle or point of interest: contour highlight, surface highlight, object trajectory visual mode.
The patent further relates to a wearable device comprising the feedback unit and three alternative methods for visual guiding.

22 Claims, 11 Drawing Sheets

FEEDBACK UNIT, WEARABLE DEVICE COMPRISING THE FEEDBACK UNIT AND METHODS FOR VISUAL GUIDING THE MOVEMENT OF A VISUALLY IMPAIRED USER HAVING MODERATE IMPAIRMENT

CROSS REFERENCE TO RELATED APPLICATION

This application claims priority to European Patent Application No. 23188524 filed on Jul. 28, 2023, which is incorporated herein by reference.

FIELD OF THE INVENTION

The invention is related to the field of assistance of the movement of visually impaired persons. In particular, the invention is related to a feedback unit, a wearable device comprising the feedback unit, and methods for visually guiding the movement of a visually impaired user having moderate impairment.

BACKGROUND OF THE INVENTION

Studies have shown that an increasing number of people is affected by various degrees of visual impairment from moderate impairment to total blindness. While these numbers are increasing, people become more aware of their needs and solutions targeted at aiding visual disability have emerged.

Some of the solutions address the people whose vision is not totally lost, by using the visual information from the environment in a sequence of steps that include:
  acquiring images from the environment by means of video cameras,
  processing the acquired images by means of some processing unit
  outputting processed images that aim to complete and/or correct the image displayed by the eyes of the person whose vision is not totally lost such that said image show the same amount of information as the one shown by the healthy eyes of the persons having normal vision, and
  displaying the processed images to the human eyes of the person affected by visual impairment, which is the user of said solutions.

Other solutions address the people who lost totally or almost totally their vision, case in which the visual information is of no or little use, said solutions relying on sensorial substitution.

To better understand the background of the invention, the altered representation of the environment in the most current visual disabilities in the absence of using any device by the user-person affected by visual impairment, is presented below:
  the images processed by the people who have cataract are like looking through a frosty or fogged-up window;
  the images processed by the people who have glaucoma usually show a narrowing of the field of view;
  the images processed by the people who have age-related macular degeneration usually have distorted blur with missing areas and sometimes with a blind spot typically formed in the centre of the field of view;
  the images processed by the people who have diabetic retinopathy usually show aleatory spots placed anywhere in the field of view.

Throughout the invention, the persons having moderate impairment condition of the vision, such as but not limited to the conditions described above-namely persons affected by cataract, glaucoma age-related macular degeneration diabetic retinopathy and in general any condition affecting the natural processing of the images shall be called "visually impaired user having moderate impairment", alternatively called "user with low vision" or "user". It shall be understood that the degree of moderate impairment varies between moderate to low and moderate to high impairment.

In WO 2008 119187 A1, the afore-mentioned processing step include the following types of processing of the acquired images:
  magnification,
  remapping of the image to avoid visual defects in the individual,
  remapping of the colours within the image,
  edge enhancement,
  at least one of the brightness and contrast intensity enhancement.

U.S. Pat. No. 10,565,755 B2 is built upon the method and system defined by WO 2008 119187 A1, providing methods of augmenting text identified in the images acquired by the camera and proposing specific methods to enhance the text by magnifying it, repositioning it, reading it etc.

Disadvantages of Prior Art

WO 2008 119187 A1 provides important aid for people with low vision, as the processing step and the display step help to fill the gaps of the vision and help to output at the end images that take advantage as much as possible of the reminders of vision. However, the main disadvantage of WO 2008 119187 A1 is the provision of excessive information to the people with low vision. This happens because the full visual information that is acquired by the visual system of a person without visual impairment in the absence of any technology, when using the teaching of WO 2008 119187 A1, must be compressed and displayed to the already more limited visual system of a person with low vision. This amount of information is, in most cases, more than the person with low vision can process. For example, if the person with low vision suffers from tunnel vision due to glaucoma, which allows only 20% of the normal field of vision to be still available, compressing the image corresponding to 100% field of vision to be displayed on 20% field of vision would result in too much information in the very small spot—that is 20%, still functional in the eye.

U.S. Pat. No. 10,565,755 B2 adds even more information from the visual field to be compressed and displayed to the person with low vision, consequently it further strains the already limited bandwidth of information that the visual system of said person.

Problem Solved by the Invention

The problem to be solved by the invention is to provide visual guiding for the movement of a visually impaired user having moderate impairment such that to eliminate the excessive information displayed to said user by displaying only relevant information for the guiding.

SUMMARY OF THE INVENTION

In a first aspect of the invention, it is provided a feedback unit configured for visual guiding the movement of a visually impaired user having moderate impairment, configured to be placed on the head of the user, the feedback unit comprising:
- means to receive navigation information from an environment processing unit, said navigation information including: ground plane, obstacles, points of interest, user's position and orientation, and paths on which the user can walk unharmed,
- a processing module configured to process the navigation information and to output visual guidance instructions to the user,
- a visual representation module configured to display the visual guidance instructions to the user, wherein the visual guidance instructions consist in:
- visual guiding modes along the path:
  - light guiding strip guiding mode,
  - visual cues signalling the direction guiding mode,
  - milestones visual guiding mode,
  - tunnel visual guiding mode,
- visual guiding modes in respect to a selected obstacle and/or point of interest:
  - contour highlight visual mode,
  - surface highlight visual mode,
  - object trajectory visual mode.

In a second aspect of the invention, it is it is provided a wearable device adapted for assisting the movement of visually impaired user having moderate impairment, configured to be placed on the head of the user, the wearable device comprising:
- a sensory unit, configured to sense the environment of the user,
- an environment processing unit configured to compute navigation information comprising ground plane, obstacles, points of interest, user position and orientation, and paths on which the user can walk unharmed,
- the feedback unit of the invention, configured for visual guiding the movement of the user,
- electronic communications means by communication protocols between the sensory unit, the environment processing unit, and the feedback unit.

In a third aspect of the invention, it is provided a method of visually guiding the movement of a visually impaired user having moderate impairment using the feedback unit of the invention, the method comprising the following steps:
- receiving navigation information from the environment processing unit, said navigation information including: ground plane, obstacles, points of interest, user position and orientation, and paths on which the user can walk unharmed,
- processing said navigation information by the processing module outputting visual guidance instructions to the user,
- displaying the visual guidance instructions to the user by the visual representation module, The visual guidance instructions are selected by the user from the following lists:
- at least one visual guiding mode along the path, or
- at least one visual guiding mode in respect to a selected obstacle or point of interest, or
- at least one visual guiding mode along the path, and at least one visual guiding mode in respect to the selected obstacle or point of interest.

The invention discloses in a fourth aspect a non-transitory computer-readable storage medium encoded with a computer program, the computer program comprising instructions executable by the feedback unit of any embodiment, which, upon such execution by the feedback unit, causes the feedback unit to perform operations of the method of visual guiding the movement of a visually impaired user having moderate impairment of any embodiment.

Some example implementations include methods, devices, systems, or non-transitory, computer-readable medium that store instructions that, when executed by a processor, cause the processor to perform operations. One example method includes receiving, by a feedback unit of a wearable device, navigation information indicating a path through an environment or an obstacle in the environment, selecting, by the feedback unit, (i) one or more particular visual guiding modes for generating a visual representation of the path through the environment, from among multiple visual guiding modes that generate different visual representations of paths, or (ii) one or more particular obstacle enhancement modes for generating a visual enhancement for the obstacle in the environment, from among multiple obstacle enhancement modes that generate different visual enhancements for obstacles, or (iii) the one or more particular visual guiding modes for generating the visual representation of the path through the environment and the one or more particular obstacle enhancement modes for generating the visual enhancement for the obstacle in the environment, and generating, by the feedback unit, (i) the visual representation of the path using the selected, one or more particular visual guiding modes, or (ii) the visual enhancement for the obstacle using the selected, one or more particular obstacle enhancement modes, or (iii) the visual representation of the path using the selected, one or more particular visual guiding modes and the visual enhancement for the obstacle using the selected, one or more particular obstacle enhancement modes. The method also includes providing, by the feedback unit, the visual representation of the path or the visual enhancement for the obstacle, or the visual representation of the path and the visual enhancement for the obstacle, for output to a user of the wearable device.

In some implementations, the one or more particular visual guiding modes may include a light strip guiding mode, and the visual representation of the path include a strip of light following the path on a ground plane in a field of view of the user. The one or more particular visual guiding modes may include a direction-signaling visual cues guiding mode, and the visual representation of the path may include a single virtual object in a field of view of the user that is oriented in a direction of the path. The one or more particular visual guiding modes may include a milestones guiding mode, and the visual representation of the path may include a series of virtual objects in a field of view of the user that are aligned along the path. The one or more particular visual guiding modes may include a tunnel visual guiding mode, and the visual representation of the path may include parallel lines following the path on a ground plane in a field of view of the user or virtual walls rising from the parallel lines. The one or more particular visual guiding modes may include two or more of a light strip guiding mode, a direction-signaling visual cues guiding mode, a milestones guiding mode, and a tunnel visual guiding mode. The visual representation of the path may be placed above the path on a vertical axis. The visual representation may appear at an adjustable visual cue distance from the user. The visual representation may be a geometric shape. The visual representation may appears to move as the user moves along the path. The visual representation may appear to stay in a same position as the user moves along the path. The visual representation may appear at a distance from the user that is based on a walking speed of the user. The visual representation may appear at a distance from the user that is based on a complexity of the environment. A shape of the visual representation may be selectable by the user. The visual representation of the path may be updated in real time as the user moves along the path. The obstacle may include a point of interest. The multiple obstacle enhancement modes may include a contour highlight mode that visually enhances contours of obstacles, a surface highlight mode that visually enhances surfaces of obstacles, an obstacle trajectory mode that visually indicates trajectories of obstacles, and a simplified map mode that visually represents obstacles as simplified geometrical shapes.

It shall be assumed that for the purpose of this invention, the user will have the feedback unit, respectively the wearable device placed on his head and that the the feedback unit, respectively the wearable device will be turned on.

Any feature in one aspect of the invention may be applied to other aspects of the invention, in any appropriate combination. In particular, method features may be applied to device features, and vice versa.

Wherever applicable, means-plus-function features may be expressed alternatively in terms of their corresponding structure, such as a suitably programmed processor and associated memory.

Particular combinations of the various features of the invention can be implemented and/or supplied and/or used independently.

Advantages of the Invention

The main advantages of this invention are the following:
reducing the amount of information displayed to the visually impaired user having moderate impairment in terms of visual guidance instructions to the meaningful information required by the user to navigate which has a further advantage of protecting the user from the tiredness due to the need to cope with too much visual information for him/her and increasing his/her resilience during the navigation;
the invention provides a large array of possibilities of visual guiding, which make the teaching of the invention adjustable to the particulars of each visually impaired user having moderate impairment.

Notes regarding the legend of the drawings to enable their understanding:
the path is represented with a full line when it is displayed to the user and represented with a dotted line, or absent when it is not displayed to the user,
the elements of the scenery which are part of the navigation information, are represented with faded lines, whereas the relevant elements which are part of the visual guidance instructions are highlighted, because the user sees only representation of the visual guidance instructions.

DETAILED DESCRIPTION

Figure 1:
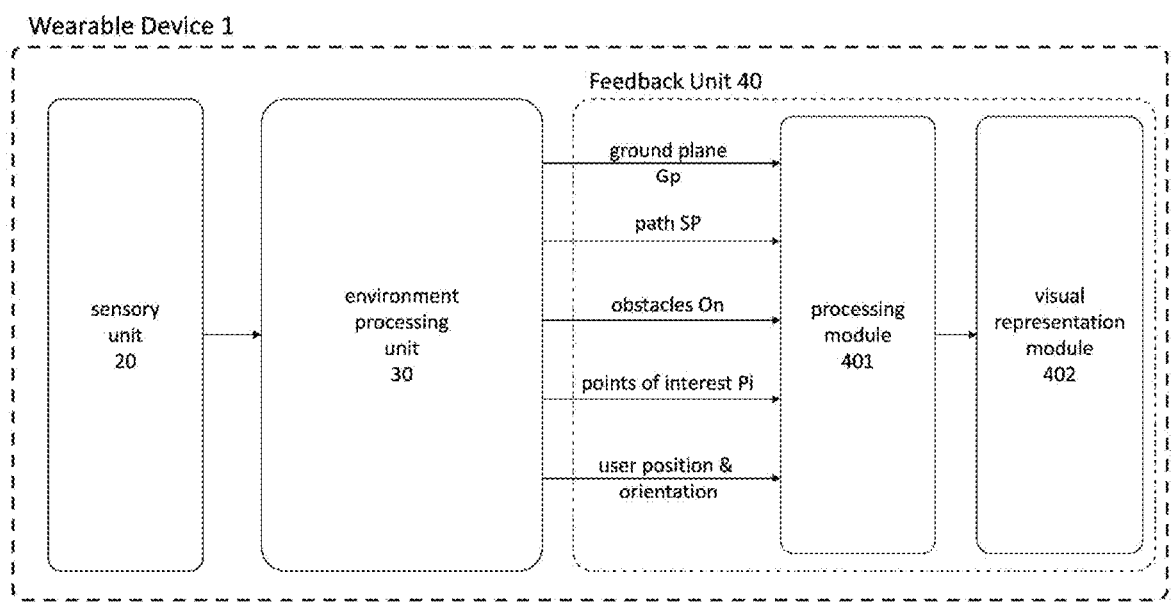
FIG. 1 schematic diagram of the invention
FIG. 2 light guiding strip guiding mode—view of the scenery from outside
FIG. 3 light guiding strip guiding mode—view of the scenery as displayed to the user
FIG. 4 visual cues signalling the direction guiding mode—view of the scenery from outside
FIG. 5 visual cues signalling the direction guiding mode—view of the scenery as displayed to the user
FIG. 6 milestones visual guiding mode—view of the scenery from outside
FIG. 7 milestones visual guiding mode—view of the scenery as displayed to the user
FIG. 8 tunnel visual guiding mode—the tunnel represented by two parallel lines having as horizontal longitudinal axis the path—view of the scenery from outside
FIG. 9 tunnel visual guiding mode—the tunnel represented by two parallel lines having as horizontal longitudinal axis the path—view of the scenery as displayed to the user
FIG. 10 tunnel visual guiding mode—the tunnel represented by virtual walls—view of the scenery from outside
FIG. 11 tunnel visual guiding mode—the tunnel represented by virtual walls—view of the scenery as displayed to the user
FIG. 12 basic scenery in which two obstacles On are represented, namely the dog and the garbage bin—view of the from the user
FIG. 13 in the contour highlight visual mode the contour of the garbage bin is enhanced
FIG. 14 in the surface highlight visual mode the entire surface of the garbage bin is enhanced
FIG. 15 in the object trajectory visual mode, the dog moving towards the user is considered as the selected obstacle On
FIG. 16 basic scenery in which two obstacles On are represented, namely the dog and the garbage bin where the obstacles are represented with their natural characteristics—view of the scenery from outside
FIG. 17 representation of the simplified map—view of the scenery from outside
FIG. 18 basic scenery in which two obstacles On are represented, namely the dog and the garbage bin where the obstacles are represented with their natural characteristics—view of the scenery from the user
FIG. 19 representation of the simplified map—view of the scenery from the user
FIG. 20 representation of the visual cues signalling the direction guiding mode—view of the scenery from the user suffering from tunnel vision due to glaucoma.

With reference to FIG. 1, the invention discloses in a first aspect a feedback unit 40 configured for visual guiding the movement of a visually impaired user having moderate impairment, the feedback unit 40 configured to be placed on the head of the user. The feedback unit 40 comprises:
means to receive navigation information from an environment processing unit 30, said navigation information including: ground plane Gp, obstacles On, points of interest Pi, user's position and orientation, and paths SP on which the user can walk unharmed,
a processing module 401 configured to process the navigation information and to output visual guidance instructions to the user,
a visual representation module 402 configured to display the visual guidance instructions to the user,
The feedback unit 40 is configured to function with any environment processing unit 30 that provides it with the navigation information comprising the ground plane Gp, obstacles On, points of interest Pi, user's position and orientation, and at least one walking path SP.

The navigation information includes the following categories:

Ground plane Gp is the plane on which the user is currently on, sitting or standing, said ground plane Gp includes the floor in a building, the sidewalk, the street, generally walkable terrain. Said ground plane Gp can be further separated in:
- Safe-to walk planes: sidewalk, indoor floor, terrain,
- Not-safe-to-walk planes: automotive roads, bodies of water, snow, etc.

Obstacles On refers to geometrical obstacles that are either moving or stationary that can pose a threat to the user if they collide with the user, either by the user walking into them or the obstacles On intercepting the user. Such obstacles On include:
- Objects: benches, cars, trees, walls, doors, etc.
- Living beings: humans, pets, wildlife.

Points of interest Pi—are objects or living beings which are of interest to him/her, either user-defined by using a communication method between the user and the feedback unit 40 which is outside the scope of this invention, or automatically defined;

User position and orientation-refers to the position and orientation of head of the user.

At least one path SP, defined as a path satisfying path criteria identified below:
- when the user walks on the path, him or her will not collide with any obstacle On and will only stay on safe-to walk ground planes Gp,
- The path SP is continuously recomputed based on the movement of the user such that the path SP always takes the user away from obstacles On while the user moves,
- The path SP should preferably lead to one selected point of interest Pi.

The way of determining the path SP is outside the scope of this invention, as well as the way of choosing one path SP when there are various paths available.

The processing module 401 is a computing unit, comprising at least one processor and at least one non-volatile memory, such as but not limited to a microcontroller, a computer, a supercomputer.

The visual representation module 402 is an apparatus comprising means of representing the visual guidance instructions outputted by the processing module 401 to the user, such as, but not limited to micro-displays, micro-LED displays, retina projectors, "smart contact lenses". For the invention, any technology used by the visual representation module 402 works as long as it offers stimulation to at least one eye of the user.

The processing module 401, by using a first set of algorithms implemented by classical and/or artificial intelligence methods, is configured to process the navigation information and to output visual guidance instructions to the user.

There are two categories of visual guidance instructions:
- visual guiding modes along the path SP,
- visual guiding modes in respect to a selected obstacle On and/or a point of interest Pi, Put in other words, with reference to FIGS. 2 to 11, the processing module 401 is configured to transpose the path SP determined by the environment processing unit 30 into each of the visual guiding modes along the path SP described below:
- light guiding strip guiding mode,
- visual cues signalling the direction guiding mode,
- milestones visual guiding mode,
- tunnel visual guiding mode, where each of said visual guiding modes along the path SP is selectable taking into account the visual disabilities and the preferences of the user.

With reference to FIGS. 12 to 15, the processing module 401 is configured to transpose the obstacles On and the points of interest Pi into each of the of visual guiding modes in respect to the obstacles On and the points of interest Pi described below:
- contour highlight visual mode,
- surface highlight visual mode,
- object trajectory visual mode, where each of said visual guiding modes in respect to the obstacles On and/or the points of interest Pi is selectable taking into account the visual disabilities and the preferences of the user.

By contrast with the prior art guiding modes, the visual guidance instructions of the invention outputted by the processing module 401 replace the real images of the environment included in the navigation information such that, when only said visual guidance instructions are displayed to the user with low vision, said user sees with his eyes only the visual guidance instructions which is the meaningful information for him or her to move around, e.g. only the path SP in the light guiding strip guiding mode. In this way the invention has the advantage of avoiding to provide excessive visual information to the user with low vision.

Yet another advantage stemming from the invention is that the visual guidance instructions are much clearer to the user than the instructions of prior art, because, as it is detailed in this description, said visual guidance instructions comprise only the relevant information.

The multitude of visual guidance instructions is advantageous, because it allows flexibility of choice among them for each particular user.

Visual Guiding Modes Along the Path SP

Figure 2:
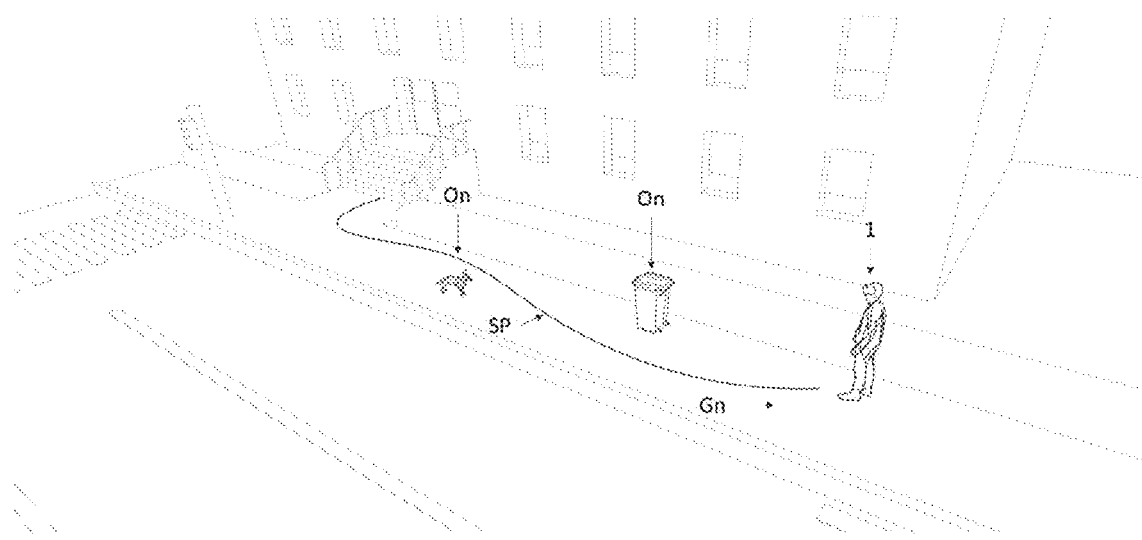
Figure 3:
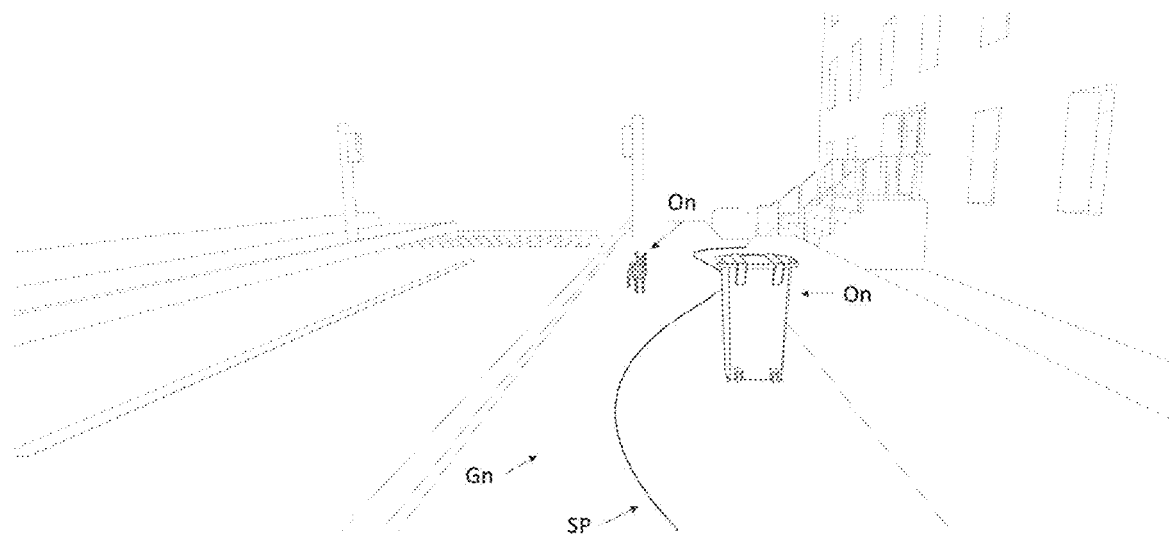

In the visual guiding mode using the light guiding strip-depicted in FIG. 2 and FIG. 3—the representation of the path SP itself is considered to be the most relevant for the visually impaired user having moderate impairment.

The processing module 401 is configured to transpose the path SP determined by the environment processing unit 30 into the light guiding strip beginning at his feet. The length of the light guiding strip is adjustable according to the preferences of the user and his visual disabilities.

In FIG. 2 the user, walking on the ground plane Gn, wants to navigate on the path SP on which two obstacles On are represented, namely a dog and a garbage bin.

In FIG. 3 it is represented the path SP, as displayed by the visual representation module 402 to the user, as the light guiding strip guiding the user along the path SP.

Figure 4:
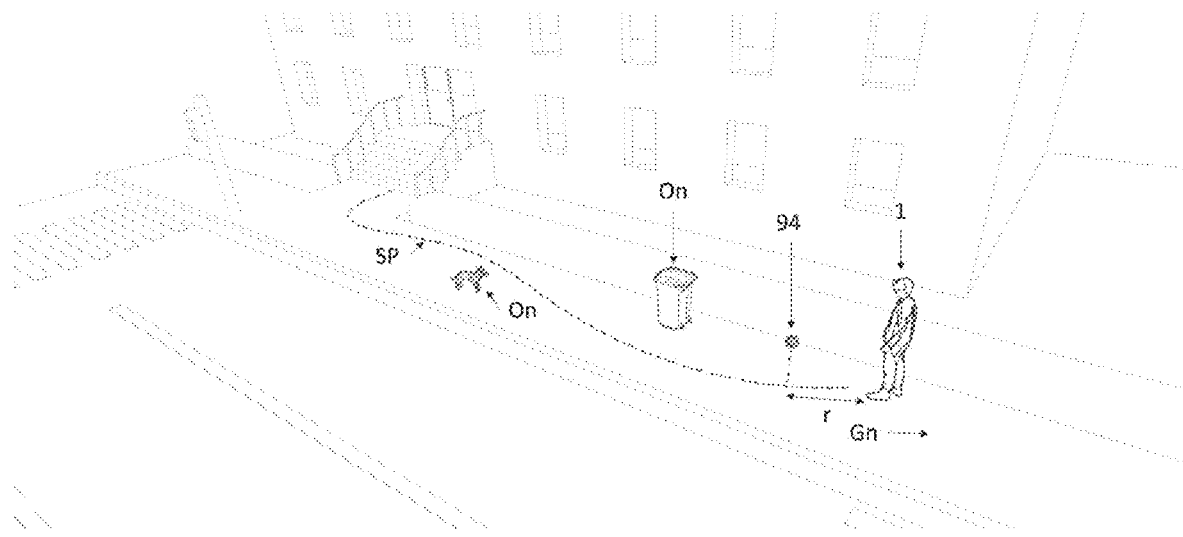
Figure 5:
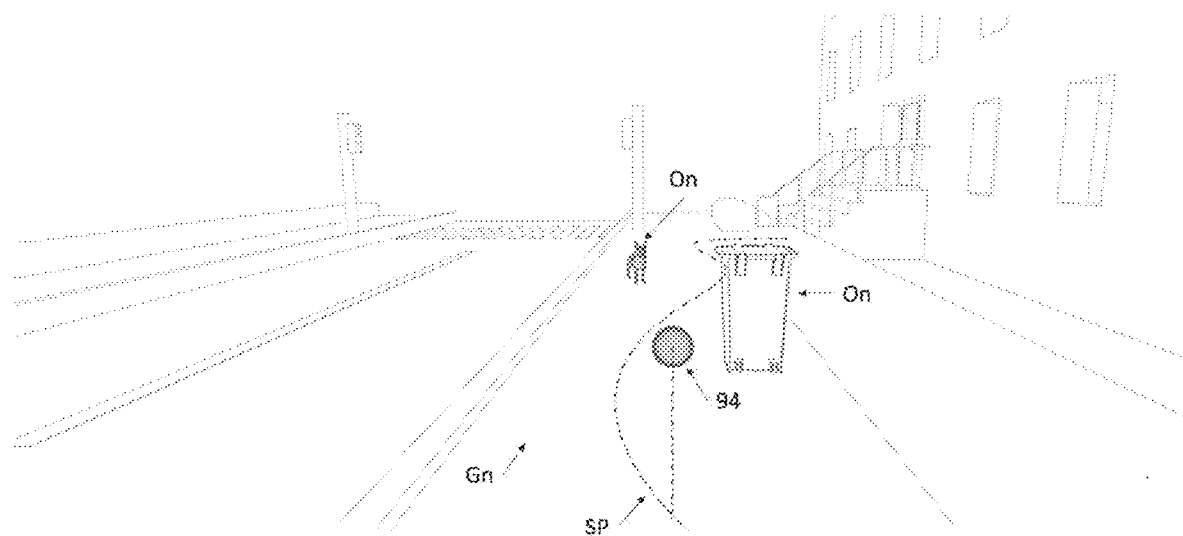

In the visual guiding mode using the visual cues signalling the direction—depicted in FIG. 4 and FIG. 5—the path SP is not represented as such.

The processing module 401 is configured to transpose the path SP determined by the environment processing unit 30 into a succession of visual cues 94 placed either on the path SP or above the path SP on a vertical axis, out of which one visual cue 94 signalling the direction is positioned on the path SP at an adjustable visual cue distance r from the user, guiding the user along the path SP in the direction signalled by the visual cue 94.

Said visual cue 94 is a geometrical shape represented in the field of view of the user and can take any geometrical 2D or 3D shape such as a sphere—as depicted in FIG. 4 and FIG. 5 or a circle, a rectangle or a cuboid, etc.

Said visual cue 94 is displayed at said adjustable visual cue distance r from the user. If the user needs to turn right, the visual cue 94 will move to the right of the field of view of the user to represent to the user that him or her should turn right. If the user must go forward, the visual cue 94 will be on the centre of the field of view of the user, to represent that the user should continue going forward. If the user must go up, the visual cue 94 will move upward.

The position of the visual cue 94 on the azimuth plane, in the field of view of the user, is directly proportional with the position of the user relative to the path SP at said visual cue distance r to indicate the direction the user should follow to stay on the path SP.

The dimension, shape, colour, and other parameters of the visual cue 94 as well as its position on the vertical axis of the field of view of the user are adjustable by the processing module 401 based on the speed of movement of the user and on the complexity of the path SP.

Said visual cue distance r is adjustable by the processing module 401 based on the speed of movement of the user and on the complexity of the path SP. If the user is walking through a more crowded environment, the distance r should be smaller than if the user is walking through a less crowded environment such that to allow the user to quickly adapt to the visual guidance instruction. The less obstacles On are, the greater the visual cue distance r is, to provide a more comfortable navigation of the user.

In FIG. 4, the user, walking on the ground plane Gn, wants to navigate on the path SP on which the same two obstacles On as in FIG. 2 are represented, namely the dog and the garbage bin.

In FIG. 5 it is represented the visual cue 94 as a sphere, displayed by the visual representation module 402 to the user.

Figure 6:
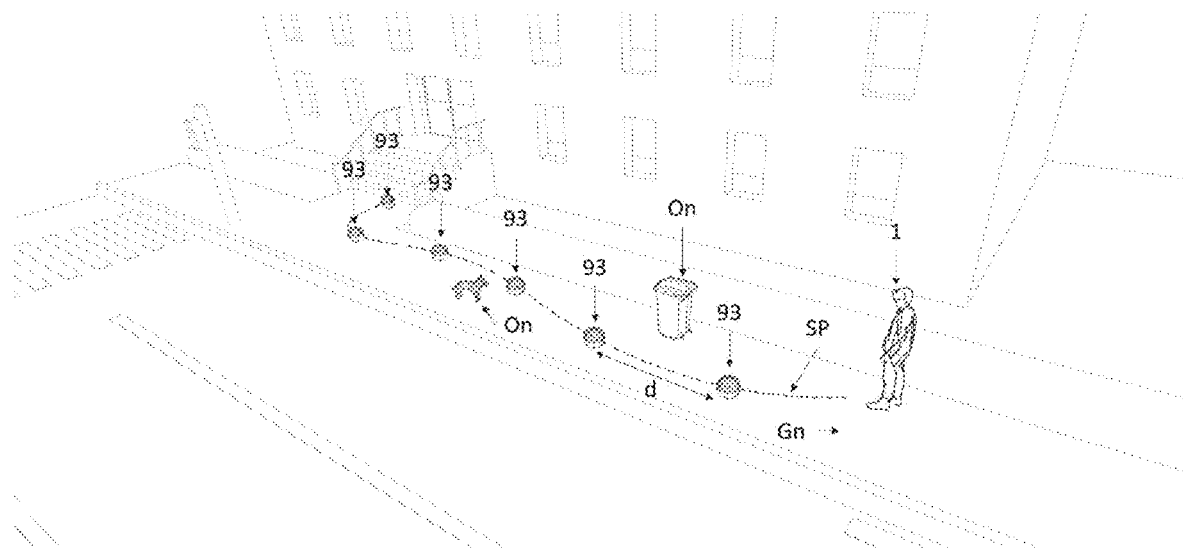
Figure 7:
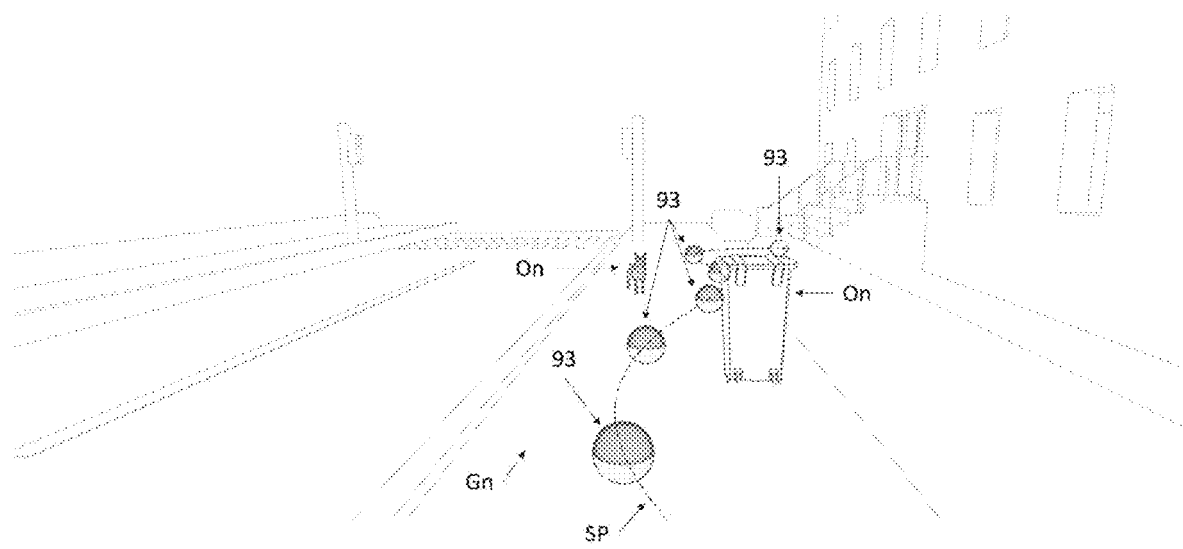

In the visual guiding mode using the milestones—depicted in FIG. 6 and FIG. 7, the processing module 401 is configured to transpose the path SP into a succession of milestones 93 placed on the path SP at a milestone distance d between them, the milestone distance d being adjustable.

Out of the succession of cues, at least one milestone 93 is perceived by the user. The milestones guide the user along the path SP from a current milestone 93 to a subsequent milestone 93.

Unlike the visual guiding mode using the visual cues signalling the direction, where the visual cue remains always at the adjustable visual cue distance r during navigation, and the user never reaches it, in the visual guiding mode using the milestones, the milestones 93 are fixed and the user is guided, when navigating, from the current milestone 93 to the subsequent milestone 93.

Each milestone 93 is a geometrical shape represented in the field of view of the user which can take any geometrical 2D or 3D shape such as a sphere—as depicted in FIG. 6 and FIG. 7, or a rectangle or a cuboid, etc.

The dimension, shape, colour, and other parameters of the milestones 93 as well as their position on the vertical axis of the field of view of the user are adjustable by the processing module 401 based on the speed of movement of the user and on the complexity of the path SP.

Said milestone distance d is adjustable by the processing module 401 based on the speed of movement of the user and on the complexity of the path SP. If the user is walking through a more crowded environment, the milestone distance d should be smaller than if the user is walking through a less crowded environment such that to allow the user to quickly adapt to the visual guidance instruction. The less obstacles On are, the greater the milestone distance d can be, to provide a more comfortable navigation of the user.

In FIG. 6 the user, walking on the ground plane Gn, wants to navigate on the path SP on which the same two obstacles On as in FIG. 2 and FIG. 4 are represented, namely the dog and the garbage bin.

In FIG. 7 there are represented various milestones 93 as spheres, displayed by the visual representation module 402 to the user.

Figure 8:
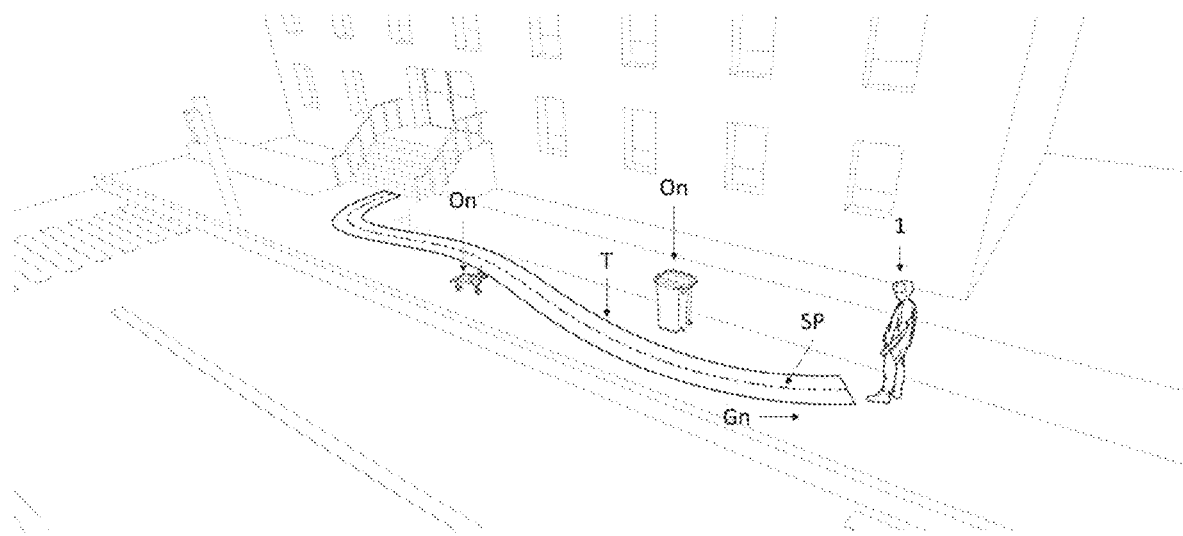
Figure 9:
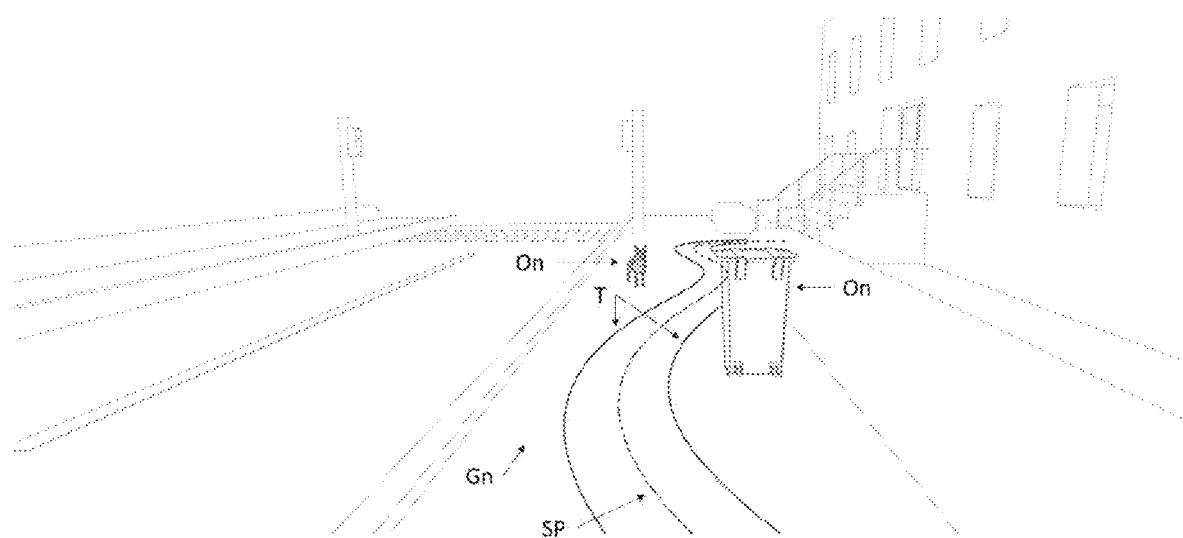
Figure 10:
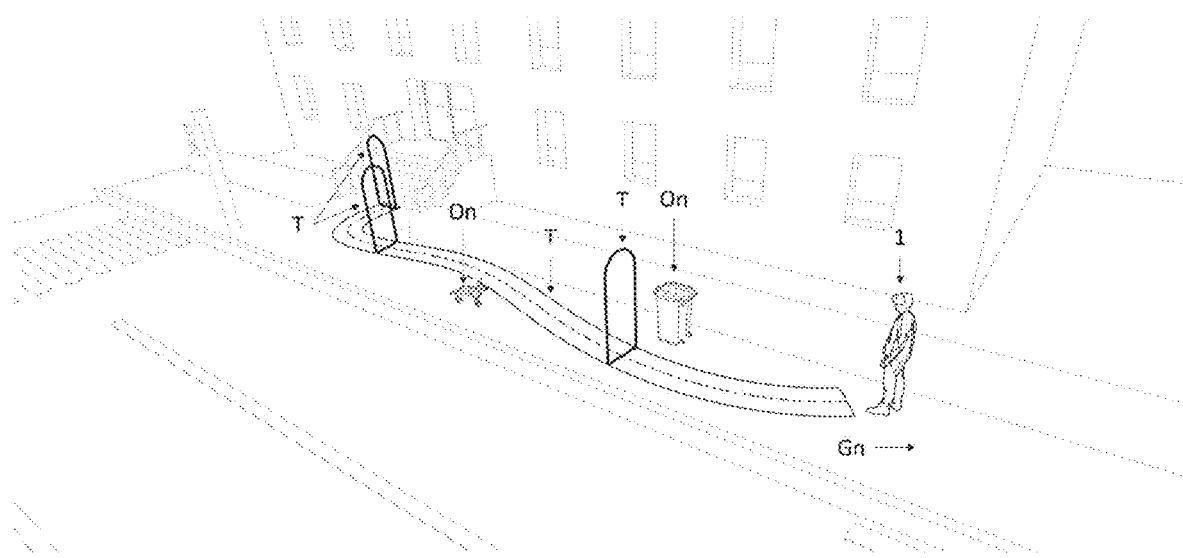
Figure 11:
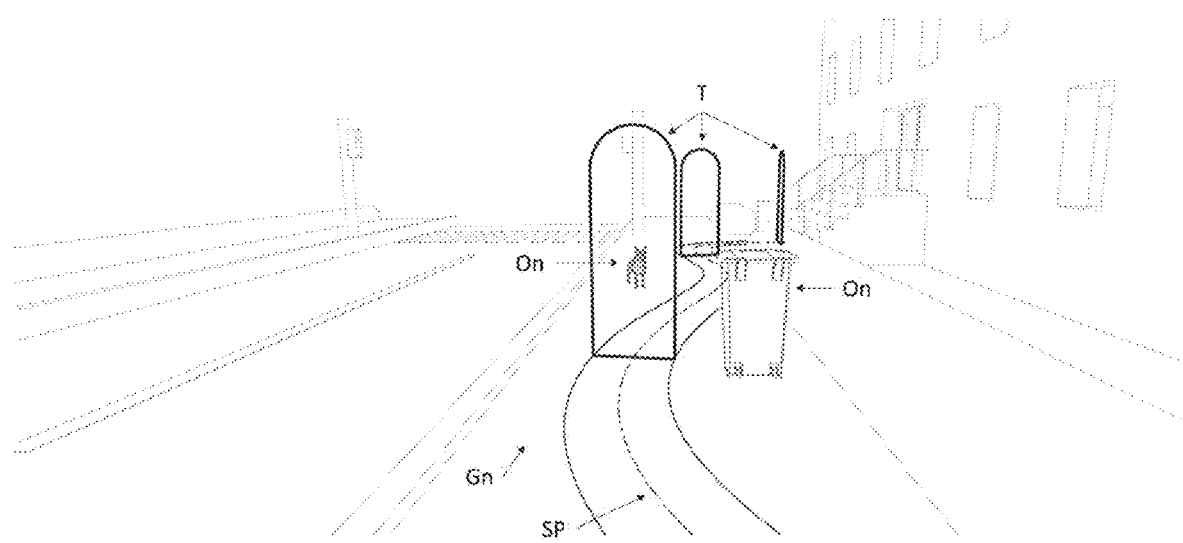

In the tunnel visual guiding mode-depicted in FIGS. 8, 9, 10, and 11—the processing module 401 is configured to transpose the path SP determined by the environment processing unit 30 into a virtual tunnel T, the trace of which on the ground plane Gp is represented either by two parallel lines—as shown in FIGS. 8, and 9, having as horizontal longitudinal axis the path SP, or by virtual walls rising from said two parallel lines—as shown in FIGS. 10, and 11; in all cases the tunnel T is built within the physical limits of the field of view of the visually impaired user having moderate impairment. No obstacles On are allowed within the limits of the virtual tunnel T.

In the tunnel visual guiding mode, said parallel lines and said virtual walls are configured to move in the field of view of the user depending on the relative position of the user towards the parallel lines. The closer the user is to one of the walls or one of the parallel lines, the closer to the user said wall or parallel line will be shown in the field of view of the user, therefore simulating effect of a tunnel and imposing to the user to stay within the tunnel T while navigating.

The distance between the two parallel lines, the height of the walls are adjustable based on the speed of movement of the user and on the complexity of the path SP.

In FIG. 8 and in FIG. 10, the user, walking on the ground plane Gn, wants to navigate on the path SP on which the same two obstacles On as in FIG. 2, FIG. 4 and FIG. 6 are represented, namely the dog and the garbage bin. The parallel lines of the tunnel are depicted as seen from outside the field of view of the user.

In FIG. 9, there are represented the parallel lines of the tunnel visual guiding mode, as displayed by the visual representation module 402 to the user, whereas in FIG. 11 the tunnel visual guiding mode depicts the walls of the tunnel T.

Visual Guiding Modes in Respect to the Selected Obstacle on and/or the Point of Interest Pi The principle behind the plurality of visual guiding modes in respect to the obstacles On and the points of interest Pi is that, given the low vision of the user, and the need to avoid providing excessive information, some of the obstacles On and/or some of the points of interest Pi are more relevant than others for the user, reason for which one obstacle On and/or one point of interest is/are selected. The relevance for the user is determined either by setting relevance criteria such as, but not limited to:

the closest obstacle On or point of interest Pi;
the fastest moving point of interest Pi towards the user;
the most dangerous obstacle On or point of interest Pi-based on a safety condition;

or by selection of the obstacles On and/or points of interest Pi by the user. The way the selection is made is outside the scope of the invention.

Figure 12:
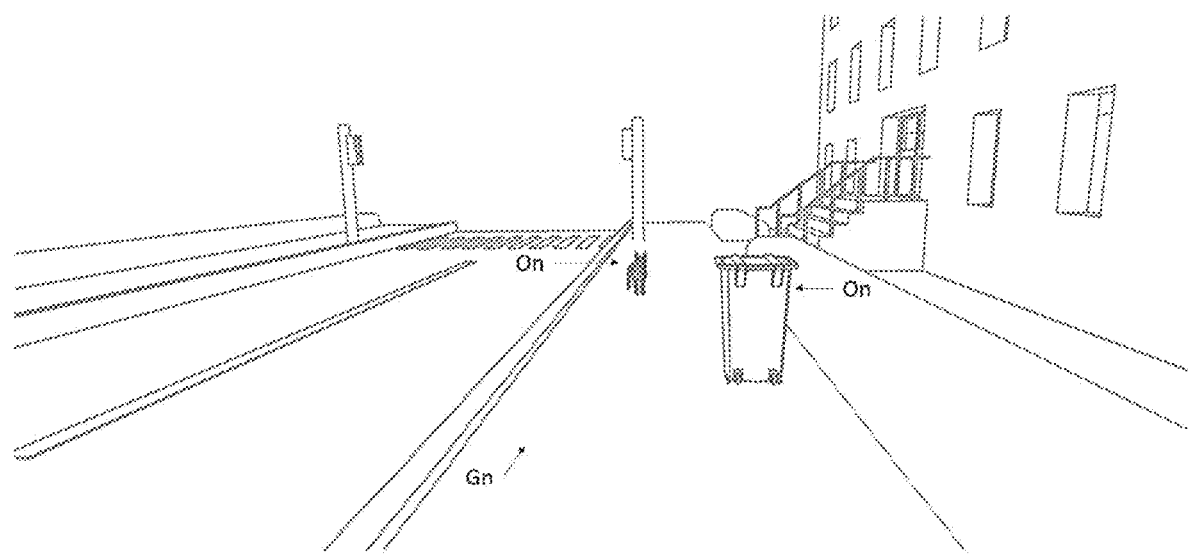

FIG. 12 depicts the basic scenery in its view of the from the user in which the two obstacles On are represented, namely the dog and the garbage bin.

Figure 13:
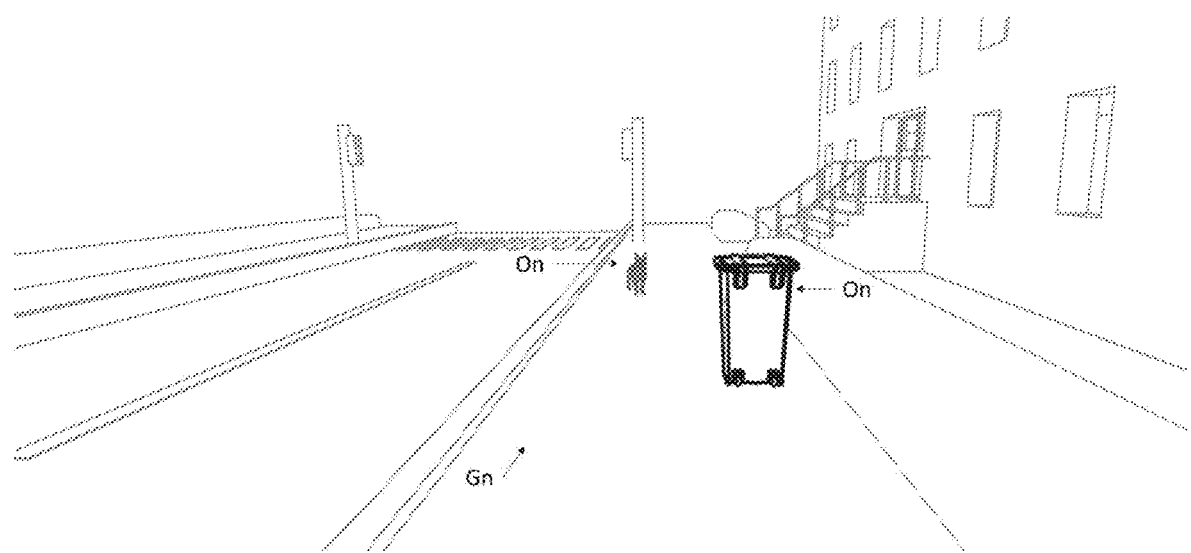
Figure 14:
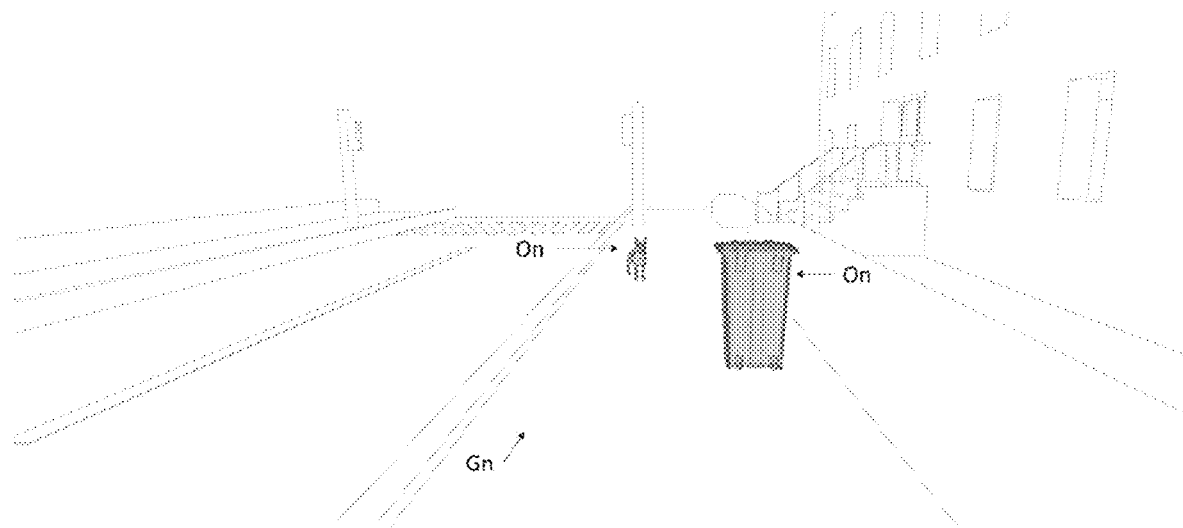
Figure 15:
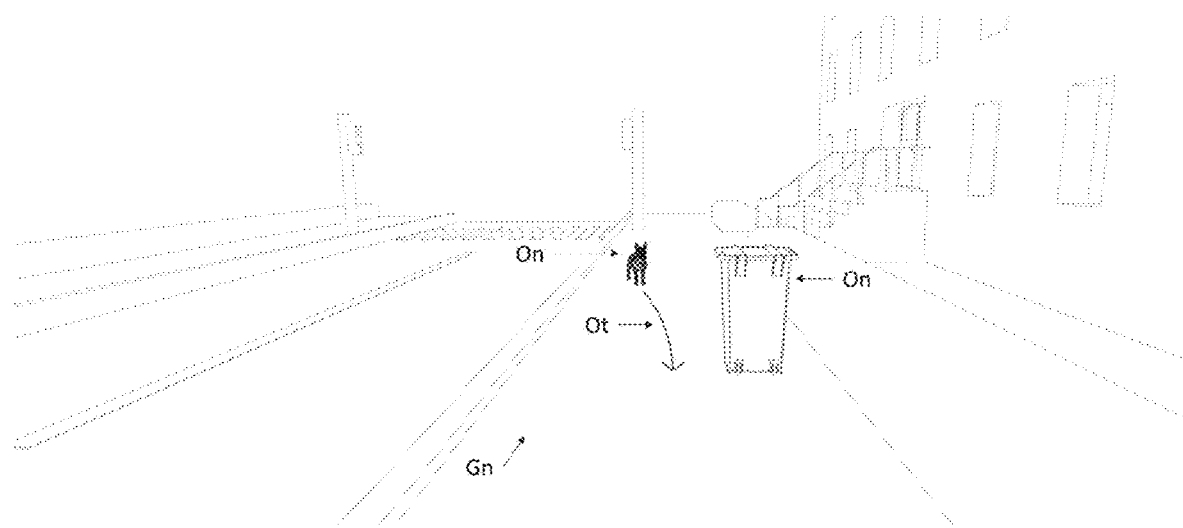
Figure 16:
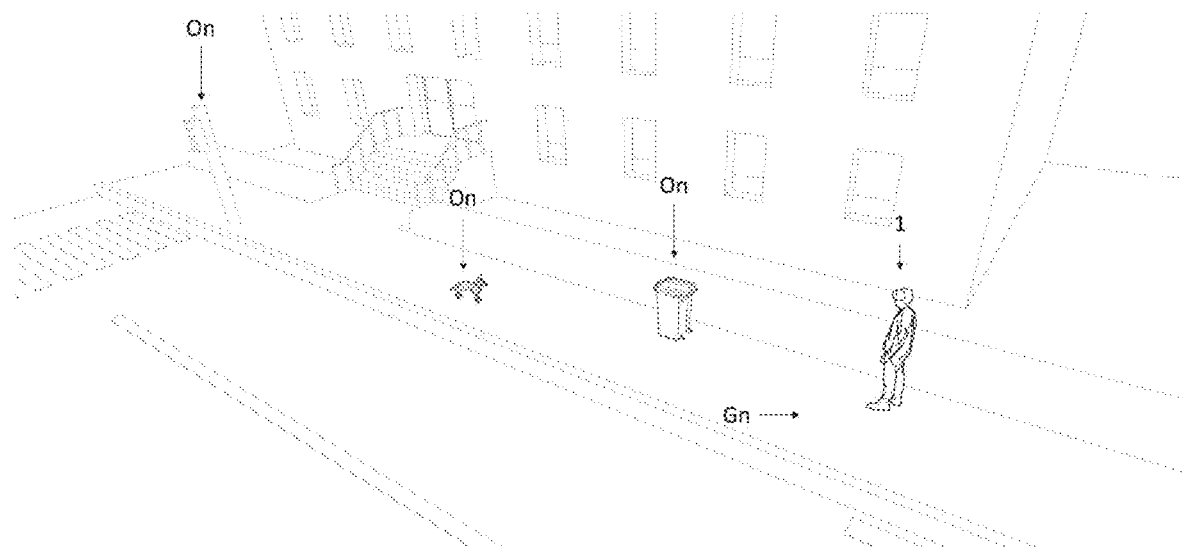

The processing module 401 is configured to select one obstacle On and/or one point of interest Pi that is/are most relevant to the user from the obstacles On and/or points of interest Pi, by applying the relevance criteria, and the processing module 401 is configured to enhance said selected most relevant obstacle On or point of interest Pi as follows:

in the contour highlight visual mode, enhance only the contour of said selected obstacle On and/or point of interest Pi—as shown in FIG. 13 where the contour of the garbage bin is enhanced;

in the surface highlight visual mode, enhance only the entire surface of said selected obstacle On and/or point of interest Pi—as shown in FIG. 14 where the entire surface of the garbage bin is enhanced;

in the object trajectory visual mode, determine and represent graphically an object trajectory Ot for said selected obstacle On and/or point of interest Pi—as shown in FIG. 15 where the dog moving towards the user is considered as the selected obstacle On. The processing module 401 is configured to adjust:

the colour and thickness of the contour in the contour highlight visual mode, the colour, glow and the optical pulsation of the entire surface in the surface highlight visual mode, the colour, contrast, glow, optical pulsation, or any other methods of representing the trajectory Ot in the object trajectory visual mode based on information such as how close the user is to said selected most relevant obstacle On and/or point of interest Pi, or how quickly said selected most relevant obstacle On and/or point of interest Pi is moving.

In the embodiments presented above using the visual guiding modes in respect to a selected obstacle On and/or point of interest Pi, the visual guidance instructions displayed to the user by the visual representation module 402 represent the ground plane Gp, the obstacles On and the points of interest Pi with their true characteristics, with the above enhancements. In other words, the dog is seen as a dog, and the garbage bin as a garbage bin, as seen in FIGS. 2-16.

In another embodiments using the visual guiding modes in respect to a selected obstacle On and/or point of interest Pi, the processing module 401 is further configured to output a simplified map, in which:

the ground plane Gp is represented by a plain surface with selectable colour and texture, the obstacles On and the points of interest Pi are represented by selectable geometrical 3D shapes, having selectable shape, colour, size, texture, and in which the visual guidance instructions are displayed based on the simplified map.

Figure 17:
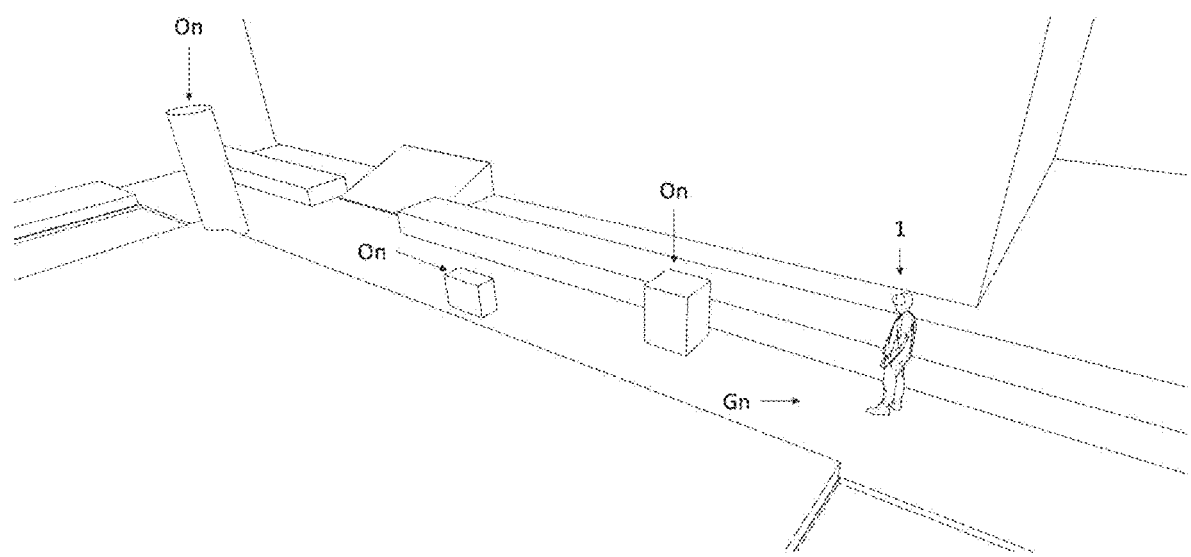
Figure 18:
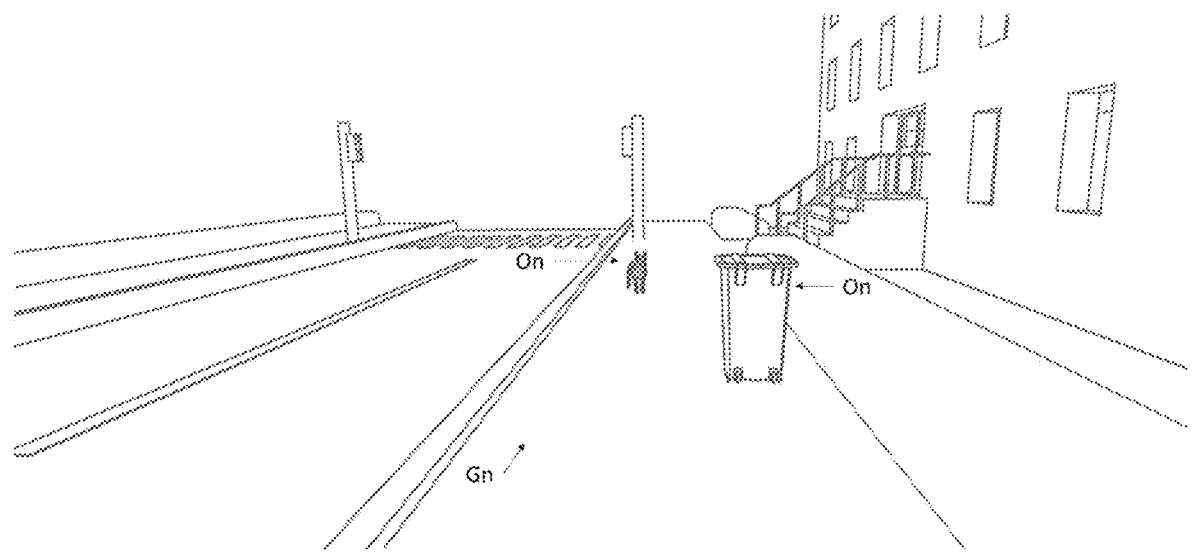
Figure 19:
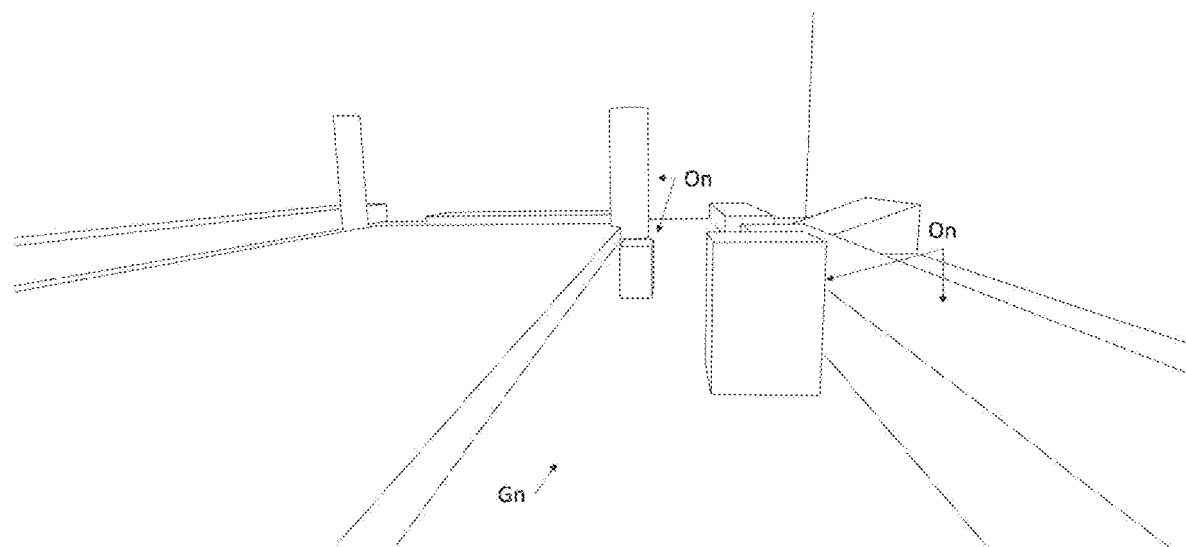

In the embodiment using the simplified map, the representation of the ground plane Gp, the obstacles On and the points of interest Pi is geometrical, as seen in FIGS. 17-19 which depicts non-limiting examples:

The ground plane Gp is represented by a plain surface with selectable colour and texture, or with colours and/or textures. The selection can be either made by the user or automatic selectable based on safety criteria such as the type of surface-walkable or not safe to walk on, or other criteria such as but not limited to the surface materials-pavement, wood, snow, water, etc.

The obstacles On as well as the points of interest Pi are represented by selectable geometrical 3D shapes with shape, colour, size, texture. The selection can be either made by the user or automatic selectable based on safety criteria such as the distance from the user to said obstacles On or, respectively points of interest Pi, or on the speed and trajectory of said obstacles On or, respectively points of interest Pi. In FIGS. 17-19, both the dog and the garbage bin are represented as boxes.

The advantage of using the simplified map is that it simplifies the representation of the obstacles On as well as of the points of interest Pi to the most prominent features, which is of use in some of the visual disabilities, such as cataract.

In the above-described embodiments, the information displayed to the user with low vision is only said visual guidance instructions.

On the other hand, the navigation information received from the environment processing unit 30 comprises images with true characteristics of the environment in which the user navigates.

In another embodiment of the invention, the processing module 401 is further configured to output selected navigation information to the visual representation module 402 and the visual representation module 402 is further configured to display the selected navigation information to the user, the degree of selection being user-configured. This embodiment is suited to those users whose degree of impairment allows them to see part of the navigation information alongside the visual guidance instructions without being a burden for their eyes. This embodiment can be combined with any and all embodiments depicting the feedback unit 40.

With reference to FIG. 1, the invention discloses in a second aspect a wearable device 1 adapted for assisting the movement of visually impaired user having moderate impairment, configured to be placed on the head of the user. Said wearable device 1 comprises:

a sensory unit 20, configured to sense the environment of the user, the environment processing unit 30 configured to compute navigation information comprising ground plane Gp, obstacles On, points of interest Pi, user position and orientation, and paths SP on which the user can walk unharmed, the feedback unit 40 according to any of the claims 1 to 10, configured for visual guiding the movement of the user, electronic communications means by communication protocols between the sensory unit 20, the environment processing unit 30, and the feedback unit 40.

The sensory unit 20 comprises multiple sensors such as, but not limited to:

RGB camera and/or other spectrum cameras,

Inertial Measurement Units-gyroscopes, accelerometers,

Orientation sensors that can detect the orientation of the wearable device 1

Depth sensors using technologies such as but not limited to, stereoscopic sensors, lidar sensors, radar sensors, ultrasonic sensors, etc.

The sensory unit 20 is configured to acquire sensor information from the environment of the visually impaired user having moderate impairment and to send the acquired sensor information to the environment processing unit 30.

The configuration of the sensory unit 20 is outside the scope of this invention.

The environment processing unit 30 is a computing unit, comprising at least one processor and at least one non-volatile memory, such as but not limited to a microcontroller, a computer, a supercomputer which, by using a second set of algorithms implemented by classical and/or artificial intelligence methods configured:

to receive from the sensory unit 20 the acquired sensor information from the environment of the visually impaired user having moderate impairment;

to compute navigation information comprising ground plane Gp, obstacles On, points of interest Pi, user position and orientation, and paths SP, and to send the navigation information to the feedback unit 40.

In one embodiment, the processing module 401 and the environment processing unit 30 are one and the same computing unit.

In an alternative embodiment, the processing module 401 is different from the environment processing unit 30.

The term "computing unit", in both alternative embodiments described above, encompasses a single computing unit or a plurality of computing units located remotely from one another communicating within a computer communication system.

In a third aspect of the invention, it is provided a method of visual guiding the movement of a visually impaired user having moderate impairment using the feedback unit of the invention, the method comprising the following steps:

receiving navigation information from the environment processing unit, said navigation information including: ground plane, obstacles, points of interest, user position and orientation, and paths on which the user can walk unharmed, processing said navigation information by the processing module outputting visual guidance instructions to the user, displaying the visual guidance instructions to the user by the visual representation module.

The visual guidance instructions are selected by the user from the following lists:

at least one visual guiding mode along the path, or at least one visual guiding mode in respect to a selected obstacle or point of interest, or at least one visual guiding mode along the path, and at least one visual guiding mode in respect to the selected obstacle or point of interest.

The possibility that the user selects the visual guidance instructions from the lists above has the advantage of providing maximum flexibility of the method because it accommodates various needs of various users. The way the user selects the visual guidance instructions is outside the scope of the invention.

Below some non-limiting examples of selection of the visual guidance instructions from the lists of the two categories.

Selection from the Four Visual Guiding Modes Along the Path SP

The four visual guiding modes along the path SP are particularly advantageous for outdoor navigation, alone or in combination.

The user can select a single visual guiding mode along the path SP, or can select more than one simultaneous guiding modes, preferably maximum two in order to avoid tiredness of the user. The reason to combine the guiding modes is to accommodate particular visual disabilities on one hand and the characteristics of the path on the other hand. Put in other words, for some particular disabilities, in some moments during navigation, one of the visual guiding modes along the path SP can be more visible to him/her thus more helpful, whereas for other moments, the other visual guiding mode along the path SP can be more visible. Some non-limiting combinations of two visual guiding modes along the path SP are the following:

light guiding strip+visual cues signalling the direction or light guiding strip+milestones–good combinations because the light guiding completes the information provided by the visual cues signalling the direction, tunnel visual e+visual cues signalling the direction or tunnel visual+milestones–good combinations because the tunnel alone may, especially for large paths, give the sensation of boredom, whereas the visual cues help to animate the user along the path.

Figure 20:
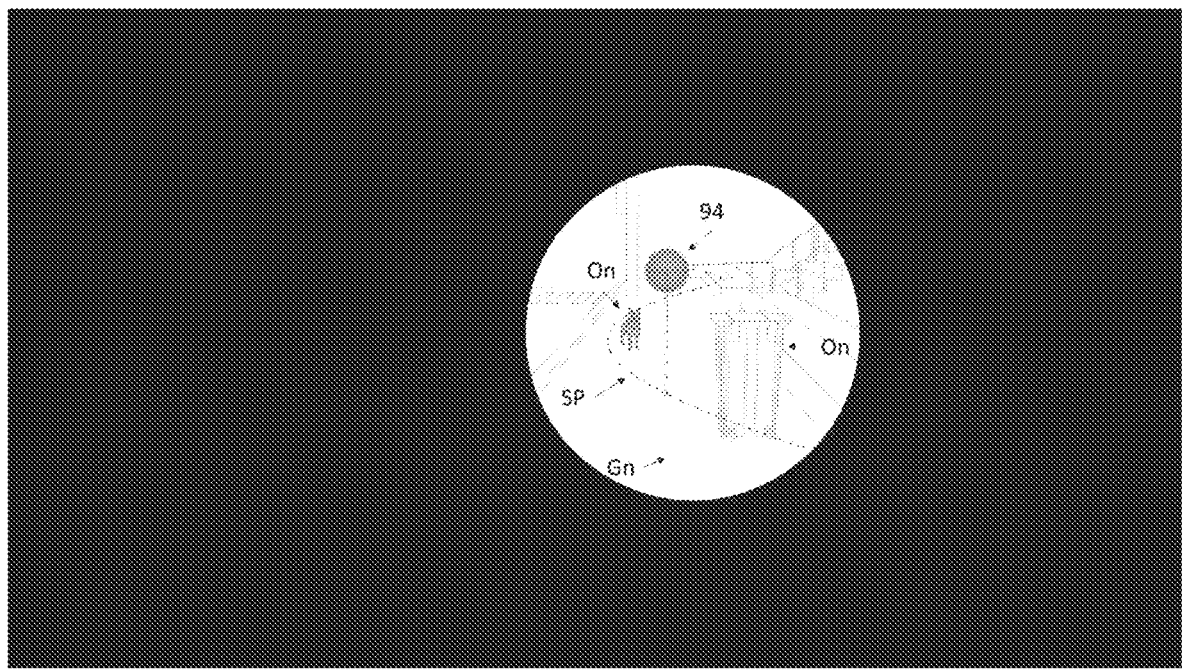
Figure 21:
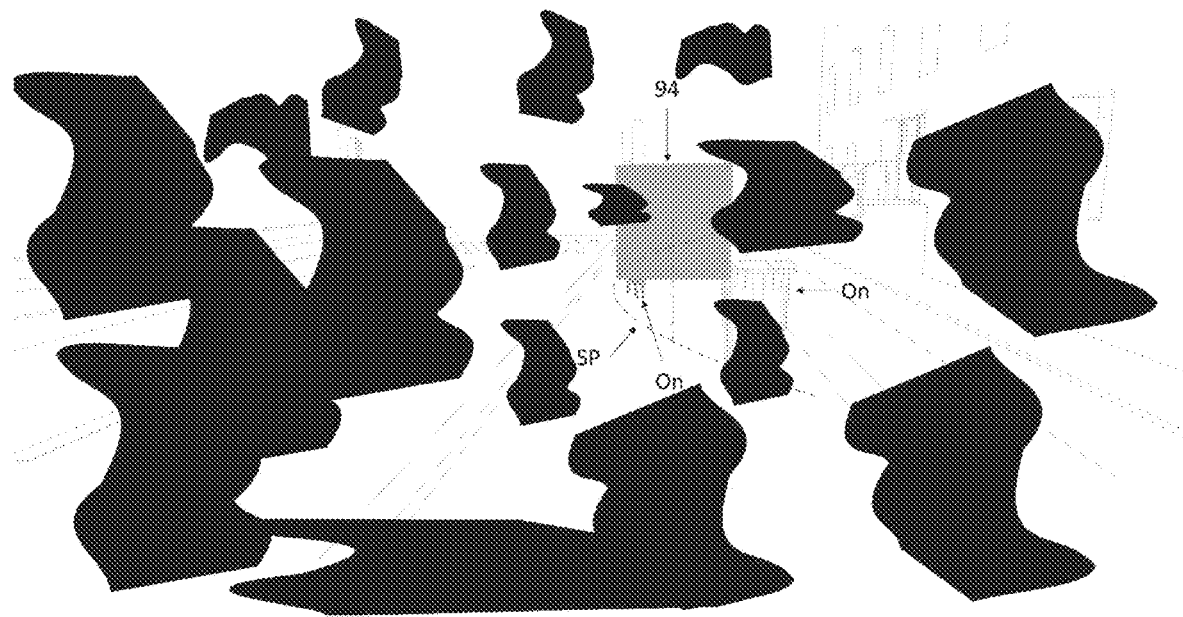
FIG. 21 representation of visual cues signalling the direction guiding mode—view of scenery is viewed from the user suffering from diabetic retinopathy.

FIGS. 20 and 21 illustrate the method using a single visual guiding mode along the path: the visual cues signalling the direction guiding mode, representing the scenery as viewed by two different users, each one with different type of visual impairment.

In FIG. 20, the user is suffering from tunnel vision due to glaucoma, thus he is able to see a portion of the normal field of view seen by a healthy person. The visual cue 94 is represented by a sphere.

In FIG. 21, the user is suffering from diabetic retinopathy, thus his field of vision has aleatory spots placed anywhere in the field of view.

The difference between the two visual guiding modes is that in FIG. 21 the representation of the visual cue 94—here a cuboid, is of much larger dimensions than the sphere of the visual cue 94 represented in FIG. 20.

Selection from the Visual Guiding Modes in Respect to a Selected Obstacle on and/or Point of Interest Pi The visual guiding modes in respect to a selected obstacle On or point of interest Pi are particularly advantageous for indoor navigation, where the path SP itself is not so important, but where there are more obstacles per unit of area than in case of outdoor navigation.

The user can select a single visual guiding modes in respect to a selected obstacle On or point of interest Pi from the three guiding modes: contour highlight visual mode, surface highlight visual mode, object trajectory visual mode, or the user can select any combination of two guiding modes, or the combination of the three of them.

contour highlight+surface highlight–good combination when it is useful to create categories: for example, in the house of the user, all the chairs of the field of view are enhanced by contour highlight visual mode, but a particular chair among them is enhanced by surface highlight to distinguish it from the others, contour highlight+object trajectory, or surface highlight+ object trajectory–good combinations when it is useful to distinguish the static obstacles On from the moving obstacles On; for example, if the user has a dog or a cat living in his house, it is advantageous to use the contour highlight visual mode or the surface highlight visual mode for the furniture and the object trajectory visual mode for the dog or the cat, the combination of all three of the above guiding modes is useful when it is necessary to combine categories and moving obstacles On; taking the examples above, all the chairs of the field of view are enhanced by contour highlight visual mode, the particular chair among is enhanced by surface highlight to distinguish it from the others, and the object trajectory visual mode is used for the dog or the cat.

Selection from the Visual Guiding Modes Along the Path SP and the Visual Guiding Modes in Respect to a Selected Obstacle on and/or Point of Interest Pi The combination of the two categories of visual guiding modes is particularly advantageous when the user navigates in a fast-changing environment, where the changes refer to the density of obstacles On and/or point of interest Pi on unit of surface, and where the visual guidance instructions have to be adapted to said conditions.

In this case, the user selects one or two visual guiding modes along the path SP and one, two or three visual guiding modes in respect to a selected obstacle On or point of interest Pi. Non-limiting examples are presented below:

- light guiding strip+contour highlight, or light guiding strip+surface highlight,
- light guiding strip+contour highlight+surface highlight,
- light guiding strip+contour highlight+surface highlighte+object trajectory,
- tunnel visual+contour highlight, or light guiding strip+surface highlight,
- tunnel visual+contour highlight+surface highlight, tunnel visual+contour highlight+surface highlight+object trajectory,
- light guiding+visual cues signalling the direction+contour highlight/surface highlight,
- light guiding strip+milestones+contour highlight/surface highlight/object trajectory,
- light guiding strip+visual cues signalling the direction+contour highlight+surface highlight/object trajectory,
- light guiding strip+milestones+contour highlight+surface highlight,
- light guiding strip+milestones+contour highlight+surface highlight,
- light guiding strip+milestones+contour highlight+surface highlight+object trajectory,
- light guiding strip+milestones visual+contour highlight+surface highlight+object trajectory,
- tunnel visual+visual cues signalling the direction/milestones+contour highlight/surface highlight/object trajectory,
- tunnel visual+visual cues signalling the direction/milestones+contour highlight+surface highlight,
- tunnel visual+visual cues signalling the direction/milestones visual+contour highlight+surface highlight+object trajectory.

It is possible to display the visual guidance instructions based on the simplified map in all the above non-limiting examples of selection of the visual guidance instructions.

The invention discloses in a fourth aspect a non-transitory computer-readable storage medium encoded with a computer program, the computer program comprising instructions executable by the feedback unit 40 of any embodiment, which, upon such execution by the feedback unit 40, causes the feedback unit 40 to perform operations of the method of visual guiding the movement of a visually impaired user having moderate impairment of any embodiment.

While the description of the method and the system was disclosed in detail in connection to preferred embodiments, those skilled in the art will appreciate that changes may be made to adapt a particular situation without departing from the essential scope to the teaching of the invention.

List of References in the Drawings

1 wearable device
20 sensory unit
30 environment processing unit
40 feedback unit
401 processing module
402 visual representation module
SP path
r visual cue distance
d milestone distance
94 visual cue
93 milestones
T tunnel
Gp ground plane
On obstacles
Pi points of interest
Ot object trajectory

The invention claimed is:

1. A computer-implemented method comprising:
receiving, by a feedback unit of a wearable device, navigation information indicating a path through an environment or an obstacle in the environment;
selecting, by the feedback unit, (i) one or more particular visual guiding modes for generating a visual representation of the path through the environment, from among multiple visual guiding modes that generate different visual representations of paths, or (ii) one or more particular obstacle enhancement modes for generating a visual enhancement for the obstacle in the environment, from among multiple obstacle enhancement modes that generate different visual enhancements for obstacles, or (iii) the one or more particular visual guiding modes for generating the visual representation of the path through the environment and the one or more particular obstacle enhancement modes for generating the visual enhancement for the obstacle in the environment;
generating, by the feedback unit, (i) the visual representation of the path using the selected, one or more particular visual guiding modes, or (ii) the visual enhancement for the obstacle using the selected, one or more particular obstacle enhancement modes, or (iii) the visual representation of the path using the selected, one or more particular visual guiding modes and the visual enhancement for the obstacle using the selected, one or more particular obstacle enhancement modes; and
providing, by the feedback unit, the visual representation of the path or the visual enhancement for the obstacle, or the visual representation of the path and the visual enhancement for the obstacle, for output to a user of the wearable device,
wherein:
the one or more particular visual guiding modes comprise a milestones guiding mode, and
the visual representation of the path comprises a series of virtual objects in a field of view of the user that are aligned along the path.

2. The method of claim 1, wherein:
the one or more particular visual guiding modes comprise a light strip guiding mode, and
the visual representation of the path comprises a strip of light following the path on a ground plane in a field of view of the user.

3. The method of claim 1, wherein:
the one or more particular visual guiding modes comprise a direction-signaling visual cues guiding mode, and
the visual representation of the path comprises a single virtual object in a field of view of the user that is oriented in a direction of the path.

4. The method of claim 1, wherein:
the one or more particular visual guiding modes comprise a tunnel visual guiding mode, and
the visual representation of the path comprises parallel lines following the path on a ground plane in a field of view of the user or virtual walls rising from the parallel lines.

5. The method of claim 1, wherein:
the one or more particular visual guiding modes comprise two or more of a light strip guiding mode, a direction-signaling visual cues guiding mode, a milestones guiding mode, and a tunnel visual guiding mode.

6. The method of claim 1, wherein:
the visual representation of the path is placed above the path on a vertical axis.

7. The method of claim 1, wherein:
the visual representation appears at an adjustable visual cue distance from the user.

8. The method of claim 1, wherein:
the visual representation is a geometric shape.

9. The method of claim 1, wherein:
the visual representation appears to move as the user moves along the path.

10. The method of claim 1, wherein:
the visual representation appears to stay in a same position as the user moves along the path.

11. The method of claim 1, wherein:
the visual representation appears at a distance from the user that is based on a walking speed of the user.

12. The method of claim 1, wherein:
the visual representation appears at a distance from the user that is based on a complexity of the environment.

13. The method of claim 1, wherein:
a shape of the visual representation is selectable by the user.

14. The method of claim 1, wherein:
the visual representation of the path is updated in real time as the user moves along the path.

15. The method of claim 1, wherein the obstacle comprises a point of interest.

16. The method of claim 1, wherein the multiple obstacle enhancement modes comprise:
a contour highlight mode that visually enhances contours of obstacles;
a surface highlight mode that visually enhances surfaces of obstacles;
an obstacle trajectory mode that visually indicates trajectories of obstacles; and
a simplified map mode that visually represents obstacles as simplified geometrical shapes.

17. A non-transitory, computer-readable medium storing instructions that, when executed by a processor, cause the processor of a wearable device to perform one or more operations comprising:
receiving navigation information indicating a path through an environment or an obstacle in the environment;
selecting (i) one or more particular visual guiding modes for generating a visual representation of the path through the environment, from among multiple visual guiding modes that generate different visual representations of paths, or (ii) one or more particular obstacle enhancement modes for generating a visual enhancement for the obstacle in the environment, from among multiple obstacle enhancement modes that generate different visual enhancements for obstacles, or (iii) the one or more particular visual guiding modes for generating the visual representation of the path through the environment and the one or more particular obstacle enhancement modes for generating the visual enhancement for the obstacle in the environment;
generating (i) the visual representation of the path using the selected, one or more particular visual guiding modes, or (ii) the visual enhancement for the obstacle using the selected, one or more particular obstacle enhancement modes, or (iii) the visual representation of the path using the selected, one or more particular visual guiding modes and the visual enhancement for the obstacle using the selected, one or more particular obstacle enhancement modes; and
providing the visual representation of the path or the visual enhancement for the obstacle, or the visual representation of the path and the visual enhancement for the obstacle, for output to a user of the wearable device,
wherein:
the one or more particular visual guiding modes comprise a milestones guiding mode, and
the visual representation of the path comprises a series of virtual objects in a field of view of the user that are aligned along the path.

18. The medium of claim 17, wherein:
the one or more particular visual guiding modes comprises a tunnel visual guiding mode, and
the visual representation of the path comprises parallel lines following the path on a ground plane in a field of view of the user or virtual walls rising from the parallel lines.

19. A wearable device comprising:
one or more processors; and
one or more non-transitory computer-readable media storing instructions that, when executed by the one or more processors, cause the one or more processors to perform operations comprising:
receiving, by a feedback unit, navigation information indicating a path through an environment or an obstacle in the environment;
selecting, by the feedback unit, (i) one or more particular visual guiding modes for generating a visual representation of the path through the environment, from among multiple visual guiding modes that generate different visual representations of paths, or (ii) one or more particular obstacle enhancement modes for generating a visual enhancement for the obstacle in the environment, from among multiple obstacle enhancement modes that generate different visual enhancements for obstacles, or (iii) the one or more particular visual guiding modes for generating the visual representation of the path through the environment and the one or more particular obstacle enhancement modes for generating the visual enhancement for the obstacle in the environment;
generating, by the feedback unit, (i) the visual representation of the path using the selected, one or more particular visual guiding modes, or (ii) the visual enhancement for the obstacle using the selected, one or more particular obstacle enhancement modes, or (iii) the visual representation of the path using the selected, particular one or more visual guiding modes and the visual enhancement for the obstacle using the selected, one or more particular obstacle enhancement modes; and
providing, by the feedback unit, the visual representation of the path or the visual enhancement for the obstacle, or the visual representation of the path and the visual enhancement for the obstacle, for output to a user of the wearable device,
wherein:
the one or more particular visual guiding modes comprise a milestones guiding mode, and
the visual representation of the path comprises a series of virtual objects in a field of view of the user that are aligned along the path.

20. A computer-implemented method comprising:
- receiving, by a feedback unit of a wearable device, navigation information indicating a path through an environment or an obstacle in the environment;
- selecting, by the feedback unit, (i) one or more particular visual guiding modes for generating a visual representation of the path through the environment, from among multiple visual guiding modes that generate different visual representations of paths, or (ii) one or more particular obstacle enhancement modes for generating a visual enhancement for the obstacle in the environment, from among multiple obstacle enhancement modes that generate different visual enhancements for obstacles, or (iii) the one or more particular visual guiding modes for generating the visual representation of the path through the environment and the one or more particular obstacle enhancement modes for generating the visual enhancement for the obstacle in the environment;
- generating, by the feedback unit, (i) the visual representation of the path using the selected, one or more particular visual guiding modes, or (ii) the visual enhancement for the obstacle using the selected, one or more particular obstacle enhancement modes, or (iii) the visual representation of the path using the selected, one or more particular visual guiding modes and the visual enhancement for the obstacle using the selected, one or more particular obstacle enhancement modes; and
- providing, by the feedback unit, the visual representation of the path or the visual enhancement for the obstacle, or the visual representation of the path and the visual enhancement for the obstacle, for output to a user of the wearable device,
- wherein the multiple obstacle enhancement modes comprise:
  - a contour highlight mode that visually enhances contours of obstacles;
  - a surface highlight mode that visually enhances surfaces of obstacles;
  - an obstacle trajectory mode that visually indicates trajectories of obstacles; and
  - a simplified map mode that visually represents obstacles as simplified geometrical shapes.

21. A non-transitory, computer-readable medium storing instructions that, when executed by a processor, cause the processor of a wearable device to perform one or more operations comprising:
- receiving navigation information indicating a path through an environment or an obstacle in the environment;
- selecting (i) one or more particular visual guiding modes for generating a visual representation of the path through the environment, from among multiple visual guiding modes that generate different visual representations of paths, or (ii) one or more particular obstacle enhancement modes for generating a visual enhancement for the obstacle in the environment, from among multiple obstacle enhancement modes that generate different visual enhancements for obstacles, or (iii) the one or more particular visual guiding modes for generating the visual representation of the path through the environment and the one or more particular obstacle enhancement modes for generating the visual enhancement for the obstacle in the environment;
- generating (i) the visual representation of the path using the selected, one or more particular visual guiding modes, or (ii) the visual enhancement for the obstacle using the selected, one or more particular obstacle enhancement modes, or (iii) the visual representation of the path using the selected, one or more particular visual guiding modes and the visual enhancement for the obstacle using the selected, one or more particular obstacle enhancement modes; and
- providing the visual representation of the path or the visual enhancement for the obstacle, or the visual representation of the path and the visual enhancement for the obstacle, for output to a user of the wearable device,
- wherein the multiple obstacle enhancement modes comprise:
  - a contour highlight mode that visually enhances contours of obstacles;
  - a surface highlight mode that visually enhances surfaces of obstacles;
  - an obstacle trajectory mode that visually indicates trajectories of obstacles; and
  - a simplified map mode that visually represents obstacles as simplified geometrical shapes.

22. A wearable device comprising:
- one or more processors; and
- one or more non-transitory computer-readable media storing instructions that, when executed by the one or more processors, cause the one or more processors to perform operations comprising:
- receiving, by a feedback unit, navigation information indicating a path through an environment or an obstacle in the environment;
- selecting, by the feedback unit, (i) one or more particular visual guiding modes for generating a visual representation of the path through the environment, from among multiple visual guiding modes that generate different visual representations of paths, or (ii) one or more particular obstacle enhancement modes for generating a visual enhancement for the obstacle in the environment, from among multiple obstacle enhancement modes that generate different visual enhancements for obstacles, or (iii) the one or more particular visual guiding modes for generating the visual representation of the path through the environment and the one or more particular obstacle enhancement modes for generating the visual enhancement for the obstacle in the environment;
- generating, by the feedback unit, (i) the visual representation of the path using the selected, one or more particular visual guiding modes, or (ii) the visual enhancement for the obstacle using the selected, one or more particular obstacle enhancement modes, or (iii) the visual representation of the path using the selected, particular one or more visual guiding modes and the visual enhancement for the obstacle using the selected, one or more particular obstacle enhancement modes; and
- providing, by the feedback unit, the visual representation of the path or the visual enhancement for the obstacle, or the visual representation of the path and the visual enhancement for the obstacle, for output to a user of the wearable device,
- wherein the multiple obstacle enhancement modes comprise:
  - a contour highlight mode that visually enhances contours of obstacles;
  - a surface highlight mode that visually enhances surfaces of obstacles;

an obstacle trajectory mode that visually indicates trajectories of obstacles; and a simplified map mode that visually represents obstacles as simplified geometrical shapes.

* * * * *